United States Patent [19]
Chu et al.

[11] Patent Number: 6,045,733
[45] Date of Patent: Apr. 4, 2000

[54] METHOD FOR MANUFACTURING A SHOE SOLE HAVING TWO DENSITIES

[75] Inventors: Shih-Chien Chu, Taichung; Jung-Fa Wu, Changhua Hsien; Chih-Hao Tseng, Changhua Hsien; Chun-Lung Chen, Changhua Hsien; Chih-Pao Chang, Changhua Hsien, all of Taiwan

[73] Assignee: Pao Chen Corporation, Taiwan

[21] Appl. No.: 09/159,712

[22] Filed: Sep. 24, 1998

[51] Int. Cl.⁷ ..................................................... B29C 44/06
[52] U.S. Cl. ..................... 264/46.6; 264/46.4; 264/245; 264/271.1; 264/273
[58] Field of Search .................... 264/45.1, 46.9, 264/46.6, 245, 273, 271.1; 36/28

[56] References Cited

U.S. PATENT DOCUMENTS

| | | |
|---|---|---|
| 4,032,611 | 6/1977 | Fukuoka ................................. 264/273 |
| 5,141,578 | 8/1992 | Yang ..................................... 264/45.1 |
| 5,147,589 | 9/1992 | Chang et al. ......................... 264/45.1 |
| 5,318,645 | 6/1994 | Yang ..................................... 264/245 |
| 5,547,620 | 8/1996 | Guiotto ................................ 264/273 |
| 5,725,823 | 3/1998 | Finn et al. ............................ 264/245 |
| 5,843,352 | 12/1998 | Chi ..................................... 264/245 |

*Primary Examiner*—Allan R. Kuhns
*Attorney, Agent, or Firm*—Patterson & Keough, P.A.

[57] ABSTRACT

A method for manufacturing a shoe sole includes step (1): preparing an inside part which has two passages defined therethrough, step (2): placing the inside part into a mold, step (3): injecting foam material into the mold to let the foam material fill in the two passages and heating the foam material so as to form abonded combination, and step (4): removing the bonded combination from the mold and drying the combination.

5 Claims, 5 Drawing Sheets

METHOD FOR MANUFACTURING A SHOE SOLE HAVING TWO DENSITIES

FIELD OF THE INVENTION

The present invention relates to a method for manufacturing a shoe sole, and more particularly, to a method for manufacturing a shoe sole having an inside part with a first density and the inside part being placed in a mold into which foam material with a second density is injected and integrally connected to the inside part.

BACKGROUND OF THE INVENTION

A conventional shoe sole (40) is shown in FIG. 5 and comprises an inside part (30) connected to the under side of the sole (40) which is made of soft material with a first density and the inside part (30) is made of hard material with a second density. The inside part (30) is used to maintain the shape of the sole (40) and provides suitable support to the foot. The process to connect the inside part (30) to the sole (40) consists of defining a recess (41) in the under side of the sole (40) and then gluing the inside part (30) in the recess (41). Because the densities of the sole (40) and the inside part (30) are different, the manufacturers have to prepare the sole (40) and the inside part (30) separately, and the periphery defining the recess (41) is required to precisely match the inside part (30) so as to firmly connect the inside part (30) to the sole (40). Furthermore, when the inside part (30) is received in the recess (41), a process is further taken to make sure that the inside part (30) does not shift. The glue has an inherent shortcoming in that the glue hardens after a period of time and forms an obvious, inflexible boundary between the sole (40) and the inside part (30). Notwithstanding that a sole (40) with two different colors is welcomed by consumers in the market, a visible boundary formed by the glue between the sole (40) and the inside part (30) will destroy the aesthetic value of the shoe.

The present invention intends to provide a method for manufacturing shoe sole with integral parts of different densities. The method is easily achieved and makes the inside part firmly be connected to the sole member.

SUMMARY OF THE INVENTION

In accordance with one aspect of the present invention, there is provided a 4 step method for manufacturing a shoe sole, comprising step (1): preparing an inside part which has at least one passage defined therethrough, step (2): placing the inside part into a mold, step (3): injecting foam material into the mold to let the foam material fill in at least one passage in the inside part and heating the foam material so as to form a bonded combination, and step (4): removing the bonded combination from the mold and drying the combination.

An object of the present invention is to provide a method for manufacturing a shoe sole having two different densities and comprising an inside part having a first density and the rest of the shoe sole having a second density, wherein the inside part is integrally bonded to the inside part.

Further objects, advantages, and features of the present invention will become apparent from the following detailed description with appropriate reference to the accompanying drawings.

DETAILED DESCRIPTION OF THE PREFERRED EMBODIMENTS

Figure 1:
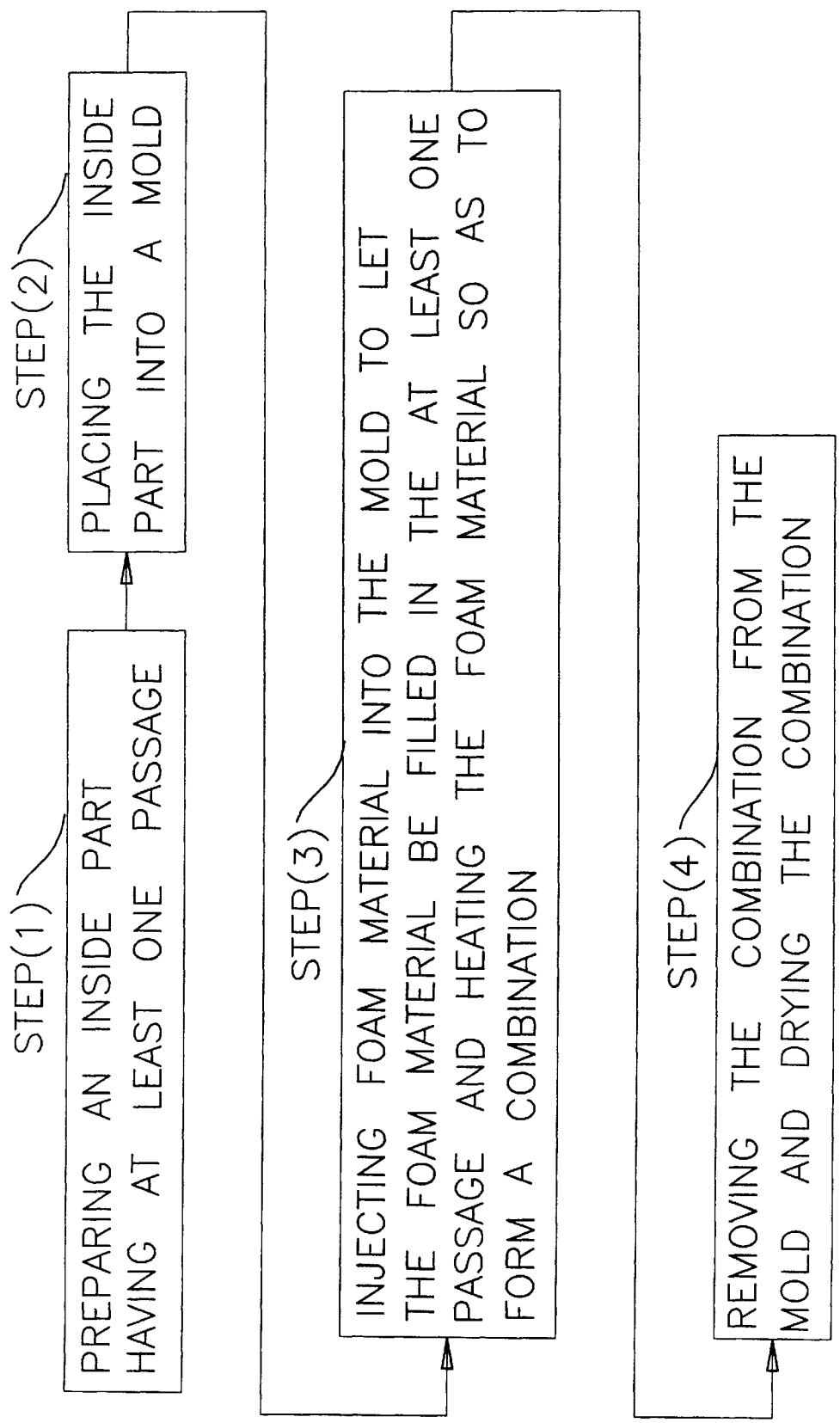
FIG. 1 is a flow chart to illustrate the steps of the method of the present invention.
Figure 2:
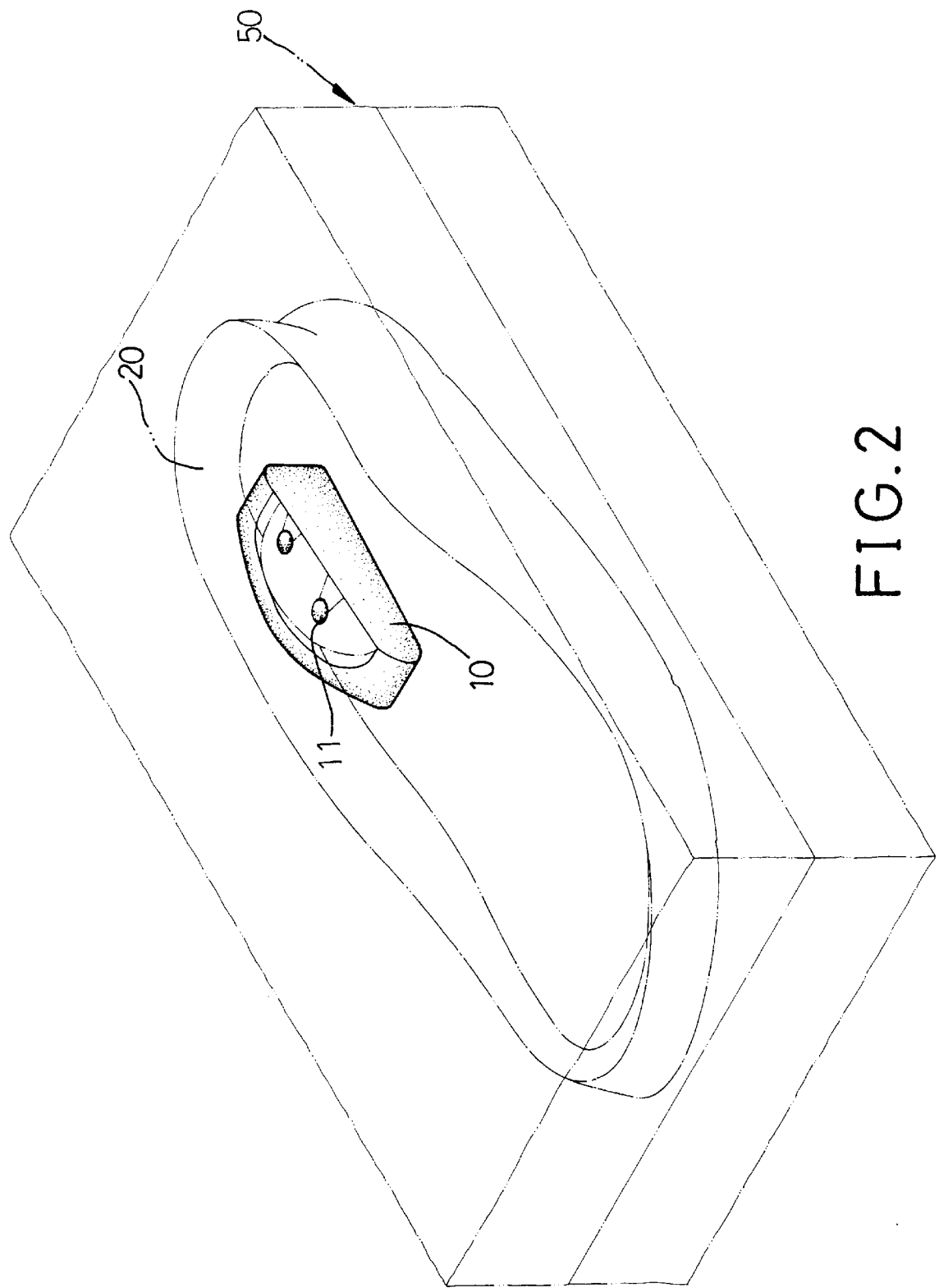
FIG. 2 is an illustrative view to show the shoe sole and the mold of the present invention.
Figure 3:
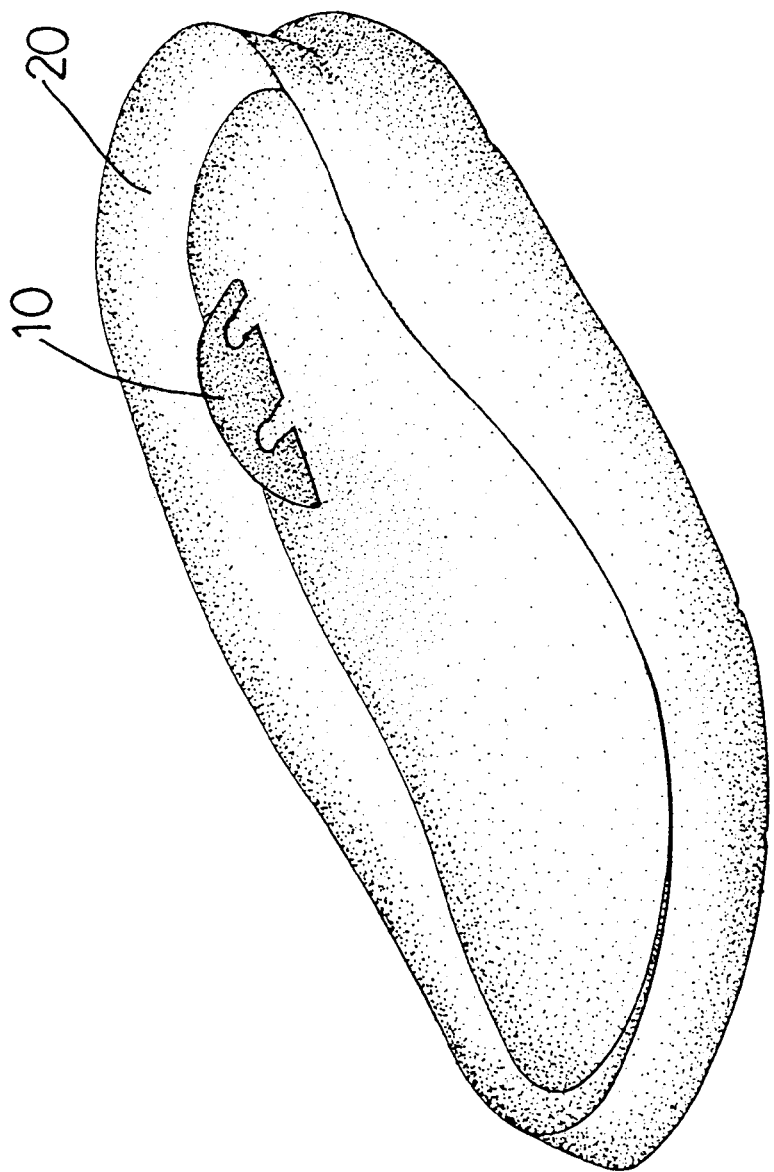
FIG. 3 is a perspective view of the shoe sole and the mold of the present invention.
Figure 4:
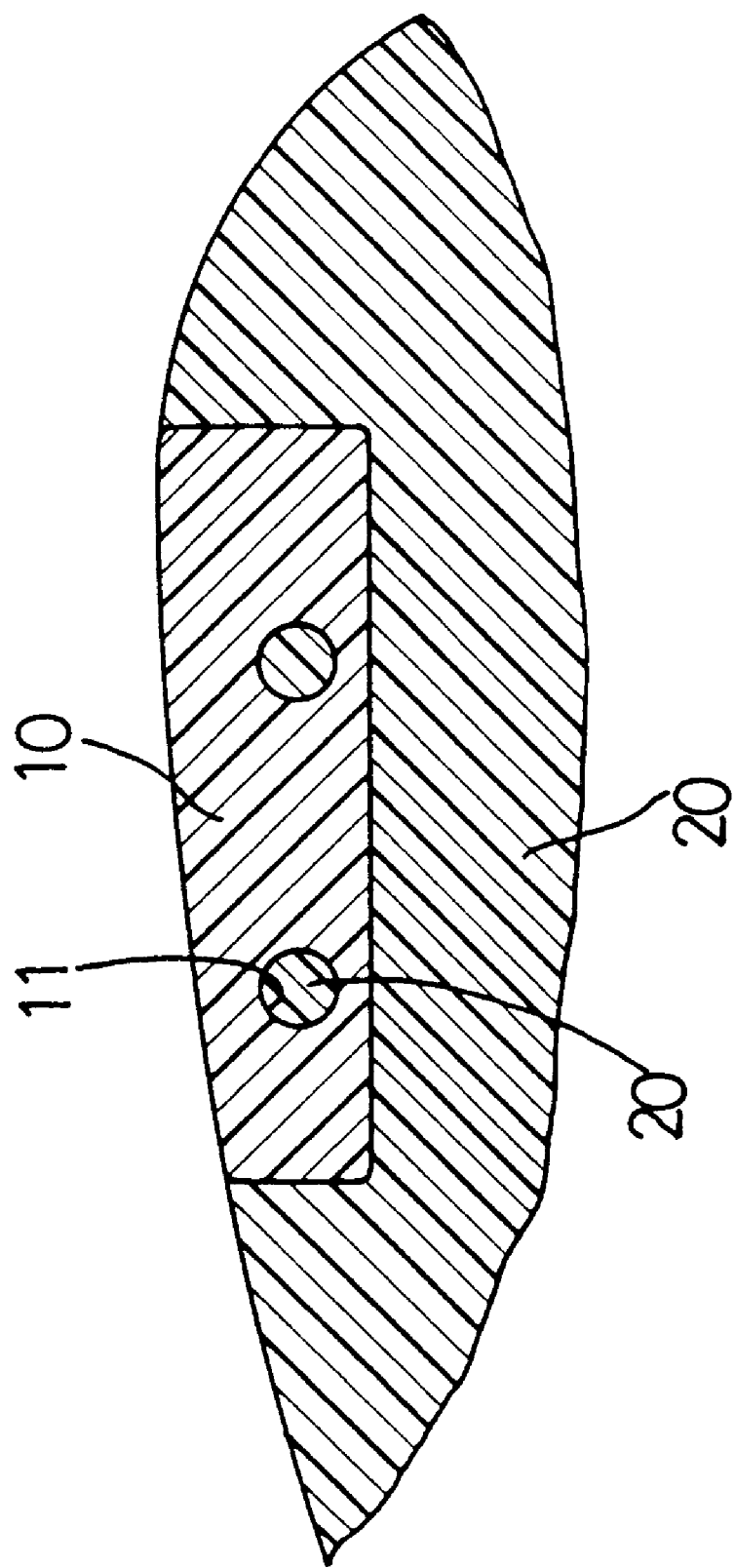
FIG. 4 is a side elevational view, partly in section, of the engagement between the inside part and the rest of the shoe sole of the present invention.
Figure 5:
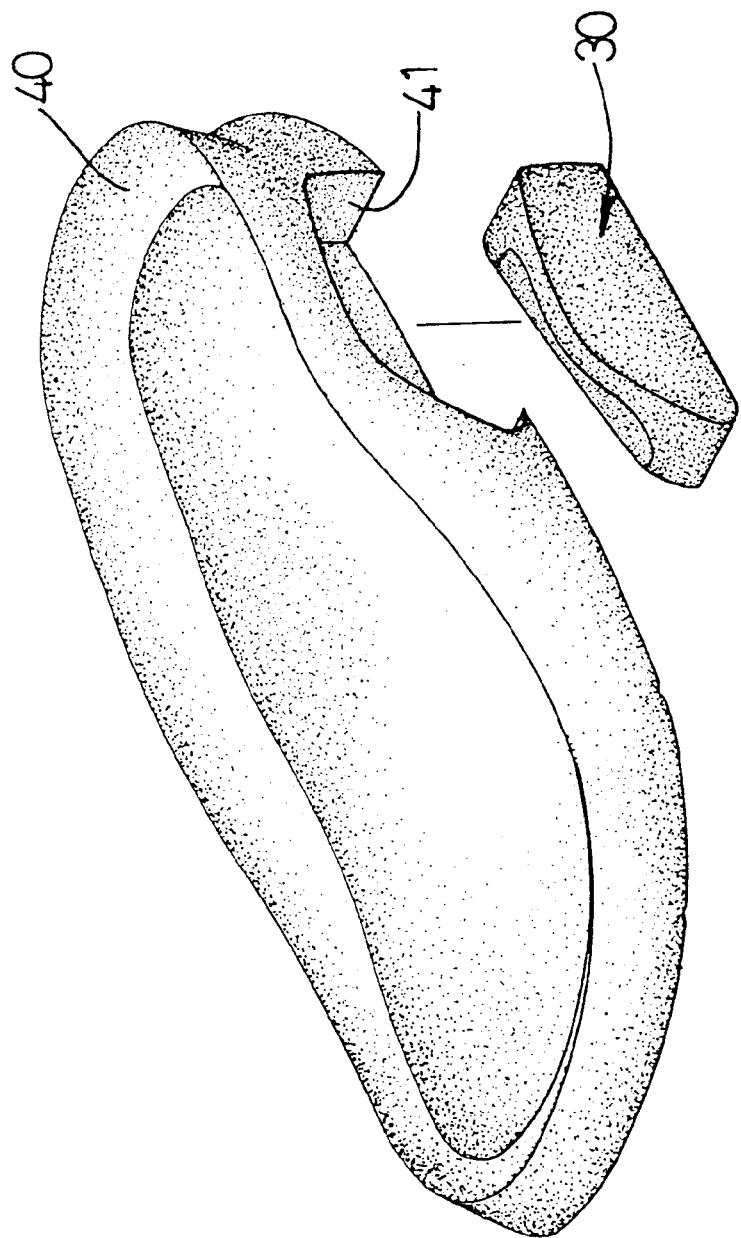
FIG. 5 is an exploded view of the conventional inside part and the shoe sole.

Referring to FIGS. 1 to 3, the method for manufacturing a shoe sole in accordance with the present invention comprises step (1): preparing an inside part (10) which has a first density and two passages (11) defined therethrough, step (2): placing the inside part (10) into a mold (50), step (3): injecting foam material into the mold (50) to let the foam material fill in the two passages (11) and heating the foam material for 5 to 10 minutes at 160 to 180 degrees Celsius to form a bonded combination, and step (4): removing the bonded combination from the mold (50) and drying the combination.

The rest of the combination, other than the inside part (10), formed in step (3) has a second density so that the inside part (10) is harder than the other portion (20) of the combination. It also may let the inside part (10) have a first color and the other portion (20) of the combination have a second color. The foam material and the material made for the inside part (10) can be Ethylene Vinyl Acetate.

The method effectively eliminates the boundary formed by the glue between the inside part (10) and the other portion (20) of the shoe sole and the inside part (10) is integrally formed in the shoe sole so that the structural bond between the inside part (10) and the other portion (20) of the shoe sole is enhanced. The density, the color or both of the inside part (10) and the other portion (20) of the shoe sole can be conveniently predetermined to meet the requirements of the market. The material of the shoe sole can be transparent and the material of the inside part (10) can be nontransparent.

Although the invention has been explained in relation to its preferred embodiment, it is to be understood that many other possible modifications and variations can be made without departing from the spirit and scope of the invention as hereinafter claimed.

What is claimed is:

1. A method for manufacturing a shoe sole, comprising:

step (1): preparing an inside part which has at least one passage defined therethrough;

step (2): placing said inside part into a mold;

step (3): injecting foam material into said mold to let said foam material fill in said at least one passage and at least partially surround said inside part and heating said foam material so as to form a bonded combination; and step (4): removing the bonded combination from said mold and drying said combination.

2. The method as claimed in claim 1, wherein said inside part has a first density and the other portion (20) of said combination has a second density.

3. The method as claimed in claim 1, wherein said inside part has a first color and the other portion (20) of said combination has a second color.

4. The method as claimed in claim 1, wherein said foam material is ethylene vinyl acetate.

5. The method as claimed in claim 1, wherein, in step (3), said foam material in said mold is heated for 5 to 10 minutes at 160 to 180 degrees Celsius.

* * * * *

UNITED STATES PATENT AND TRADEMARK OFFICE
CERTIFICATE OF CORRECTION

PATENT NO. : 6,045,733
DATED : April 4, 2000
INVENTOR(S) : Shih-Chien Chu, et al.

It is certified that error appears in the above-indentified patent and that said Letters Patent is hereby corrected as shown below:

On the title page, item [73] correct the assignee name by replacing the name and address, "Pao Chen Corporation, Taiwan", with the name and address, –Pou Chen Corporation, Taiwan–.

Signed and Sealed this

Twenty-seventh Day of March, 2001

*Attest:*

NICHOLAS P. GODICI

*Attesting Officer*

Acting Director of the United States Patent and Trademark Office

UNITED STATES PATENT AND TRADEMARK OFFICE
CERTIFICATE OF CORRECTION

PATENT NO. : 6,045,733
DATED : April 4, 2000
INVENTOR(S) : Shih-Chien Chu, et al.

It is certified that error appears in the above-identified patent and that said Letters Patent is hereby corrected as shown below:

Title page,
Item [73], correct the assignee name by replacing the name and address, "Pao Chen Corporation, Taiwan", with the name and address, -- Pou Chen Corporation, Taiwan --.

Signed and Sealed this

Twenty-third Day of October, 2001

Attest:

NICHOLAS P. GODICI
Acting Director of the United States Patent and Trademark Office Attesting Officer